United States Patent [19]
Abrams

[11] 3,721,466
[45] March 20, 1973

[54] VEHICLE WIND TUNNEL

[76] Inventor: Arthur B. Abrams, 5221 Sierra Villa Drive, Los Angeles, Calif. 90041

[22] Filed: Jan. 27, 1971

[21] Appl. No.: 110,158

[52] U.S. Cl. ............... 296/1 S, 105/2 R, 188/270, 296/23 R
[51] Int. Cl. .............................................. B62d 37/02
[58] Field of Search ...... 296/1 S, 23 R; 105/2 R, 2 A; 188/270

[56] References Cited

UNITED STATES PATENTS 2,514,695  7/1950  Dempsey ........................... 296/1 S X
2,725,944  12/1955  Lee et al. ........................... 296/1 S X
3,415,566  12/1968  Kerrigan ............................ 296/1 S

FOREIGN PATENTS OR APPLICATIONS 883,402  7/1953  Germany ............................ 296/1 S Primary Examiner—Kenneth H. Betts
Assistant Examiner—Leslie J. Paperner

[57]  ABSTRACT

A rectangular or square shaped duct or wind tunnel to be attached within interior of a vehicle, connecting opposing window or vent areas to provide a guided free flow of air to pass completely through vehicle without damage to interior or entrapment of foreign matter, within the vehicle.

1 Claim, 4 Drawing Figures

PATENTED MAR 20 1973 3,721,466
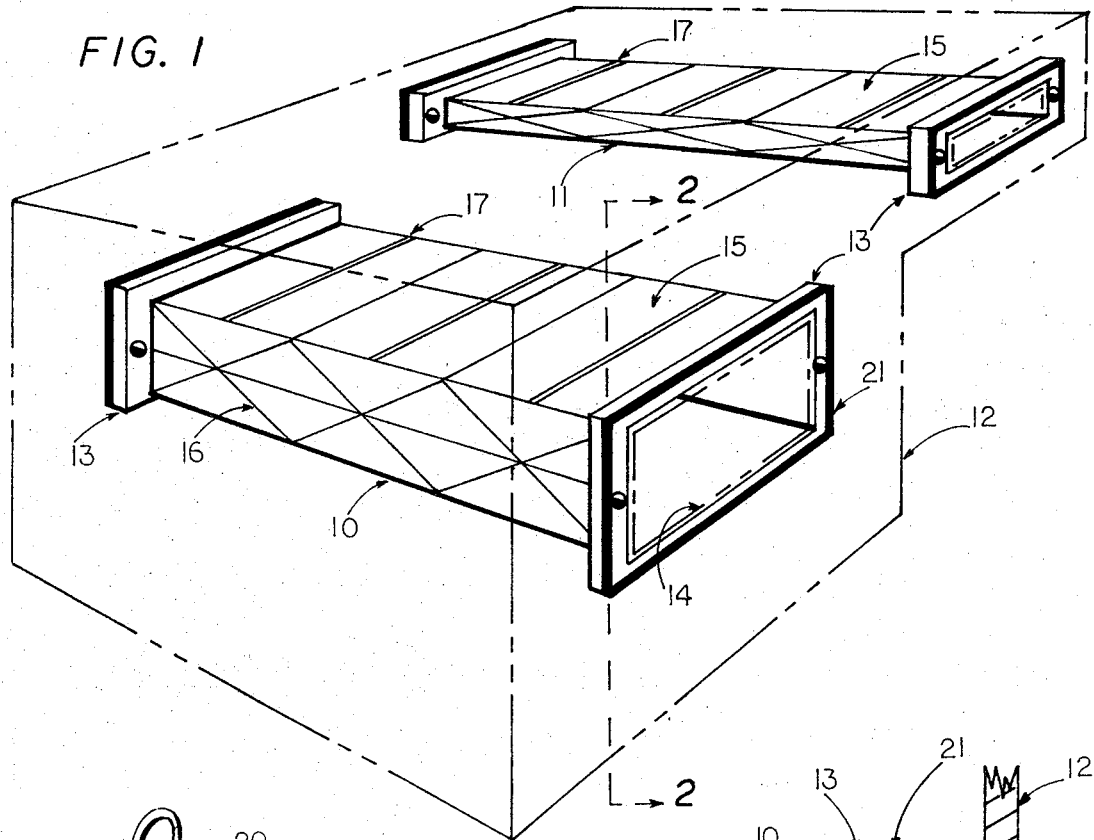
FIG. 1
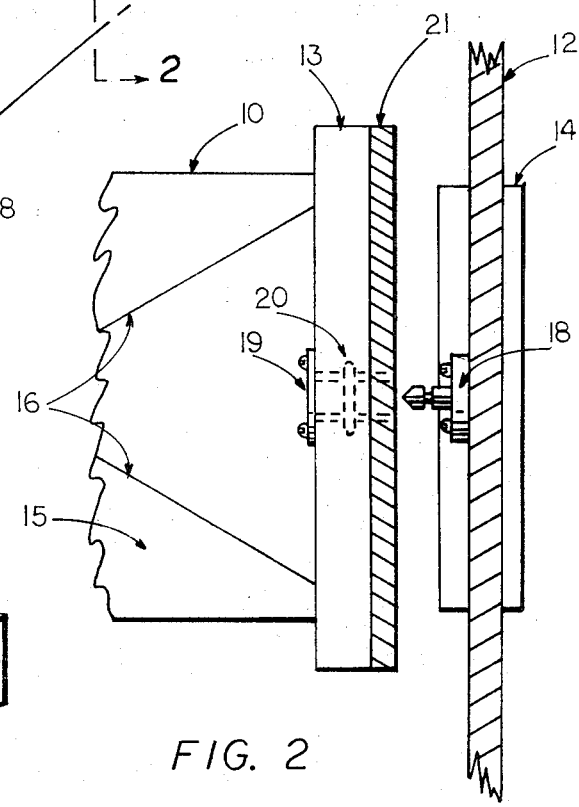
FIG. 3
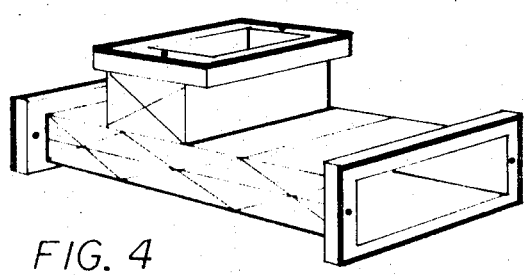
FIG. 4
FIG. 2
Arthur B. Alvarino
INVENTOR

VEHICLE WIND TUNNEL

BACKGROUND OF THE INVENTION

By utilizing the usual configuration of trailer, truck-camper, mobile home and truck van bodies with windows or vents on opposing walls, a duct or tunnel placed between the opposing openings allows air to flow unrestricted through the vehicle to be vented without confinement within vehicle interior. The resulting reduction of air pressure against the large flat exterior surfaces of the vehicle prevents a loss of steering control due to sway effect, or possible overturning of vehicle due to light weight resistance to high wind pressures. The method of relieving air pressure in the past has been to use vehicle in transit with windows or vent areas open with resultant damage to interior of vehicle by air trapped prior to exit. The only other alternative has been to park vehicle in protective area or tie down to prevent overturning.

SUMMARY OF THE INVENTION

The above described and other distadvantages of a lack of protection against wind pressures are overcome by providing means for restricting the flow of air within a vehicle while accomplishing the reduction of air pressure against the sides of the vehicle by use of this invention.

The above described and other advantages of the present invention will be better understood from the following description when considered in connection with the accompanying drawings.

BRIEF DESCRIPTION OF THE DRAWINGS

FIG. 1 is a perspective view of ducts attached in place within interior of vehicle.

FIG. 2 is a sectional view of duct taken on Line 2—2 shown in FIG. 1.

FIG. 3 is a perspective view of locking pin and snap catch used for attaching to vehicle wall.

FIG. 4 is a perspective view of alternate duct configuration to allow venting of air through roof or front or rear of vehicle, where applicable, in addition to side venting.

DESCRIPTION OF THE PREFERRED EMBODIMENTS

In FIG. 1, ducts 10 and 11 are shown in place within vehicle body 12. Plastic or metal formed end frames 13 are shown surrounding vehicle interior window frames 14. Duct end frames 13 are connected by a flexible plastic material 15, creased at points 16 for folding for compact storage, and including stiffeners 17 to prevent sagging. As is shown in FIG. 2, vehicle body wall 12 has locking pins 18 attached at sides of window frames 14. Duct 10 has tubular sleeve 10 including snap ring 20 in end frame 13. Sponge rubber seal 21 on end frame 13, when in position against vehicle wall 12, prevents leakage of air, water or dirt into vehicle. FIG. 4 shows additional configuration of duct to include venting of air through roof, front or rear of vehicle body 12, when such openings are in proximity of placement of ducts 10 and 11.

In operation, unit is removed from storage in vehicle, unfolded, expanded to full length, then attached to anchoring pins at window of one wall, stretched to other wall and attached to anchoring pins at other window. Prior to installation of unit, windows or vents of vehicle are secured in fully open position.

I claim:

1. An accessory for use within camper vehicles of the type having opposing side window means, comprising a flexible and foldable plastic tunnel having a length adapted to extend between said opposing side window means, rigid frames surrounding and secured to each open end of said tunnel, said frames having compressible weatherstrip seal material adhering to their extreme end surfaces, and fastening means for releasably securing said tunnel between said opposing side window means with said each frame surrounding a side window means, thereby providing a means for the restraint and guidance of the passage of air from an open window means on one side of the vehicle, into and through the tunnel assembly, and discharge through the open window means on the opposing side for prevention of vortical motion and pressure of entrapped air against interior wall surfaces of said vehicle.

* * * * *